(12) United States Patent
Tsai et al.

(10) Patent No.: US 12,537,459 B2
(45) Date of Patent: Jan. 27, 2026

(54) SERVER POWER SUPPLY UNIT WITH HOT-SWAPPABLE RECTIFIER MODULES AND DUAL INPUT SOURCES

(71) Applicant: DELL PRODUCTS L.P., Round Rock, TX (US)

(72) Inventors: Meng-Ru Tsai, Xizhi District (TW); Chia-Hung Chen, Taoyuan (TW); Ming-Tung Lai, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 18/499,265

(22) Filed: Nov. 1, 2023

(65) Prior Publication Data

US 2025/0141361 A1 May 1, 2025

(51) Int. Cl.
| G06F 1/16 | (2006.01) |
| G06F 1/26 | (2006.01) |
| H02M 7/00 | (2006.01) |
| H02M 7/217 | (2006.01) |
| H05K 5/00 | (2025.01) |
| H05K 7/00 | (2006.01) |

(52) U.S. Cl.
CPC ............ H02M 7/003 (2013.01); G06F 1/263 (2013.01); H02M 7/217 (2013.01)

(58) Field of Classification Search
CPC ............ G06F 1/263; G06F 1/26; G06F 1/266; H02M 7/003; H02M 7/217; H02M 7/02; H02M 7/00; H02M 7/2173; H02M 7/2176
See application file for complete search history.

(56) References Cited

U.S. PATENT DOCUMENTS

| 7,450,383 | B1 | 11/2008 | Li et al. | |
| 8,242,704 | B2* | 8/2012 | Lethellier | H05B 45/10 |
| | | | | 315/276 |
| 11,876,383 | B1* | 1/2024 | Safaee | H02J 50/12 |
| 2002/0036431 | A1* | 3/2002 | Vogman | H02J 9/061 |
| | | | | 307/87 |
| 2002/0060918 | A1* | 5/2002 | Drobnik | H02J 50/12 |
| | | | | 363/68 |
| 2002/0181254 | A1* | 12/2002 | Drobnik | H02J 3/02 |
| | | | | 363/37 |
| 2010/0060175 | A1* | 3/2010 | Lethellier | H05B 47/105 |
| | | | | 315/164 |
| 2011/0031946 | A1* | 2/2011 | Egan | G05F 1/563 |
| | | | | 323/266 |
| 2011/0103104 | A1* | 5/2011 | Zhan | H02M 3/33507 |
| | | | | 363/21.17 |
| 2013/0111098 | A1 | 5/2013 | Li et al. | |
| 2019/0208592 | A1* | 7/2019 | Hsia | H05B 45/3578 |

* cited by examiner

*Primary Examiner* — Anthony M Haughton
(74) *Attorney, Agent, or Firm* — Larson Newman, LLP

(57) ABSTRACT

A power supply unit for a computer component includes a voltage regulator and an enclosure. The voltage regulator receives an input voltage at a first voltage level and provides a regulated output voltage at a second voltage level. The enclosure houses the voltage regulator and includes a first slot to receive a first rectifier module and a second slot to receive a second rectifier module. The first slot is configured to couple a first output from the first rectifier module to the input of the first voltage regulator, and the second slot is configured to couple a first output from the second rectifier module to the input of the first voltage regulator.

20 Claims, 5 Drawing Sheets

SERVER POWER SUPPLY UNIT WITH HOT-SWAPPABLE RECTIFIER MODULES AND DUAL INPUT SOURCES

FIELD OF THE DISCLOSURE

This disclosure generally relates to information handling systems, and more particularly relates to a server power supply unit with hot-swappable rectifier modules and dual input sources in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A power supply unit for a computer component may include a voltage regulator that receives an input voltage at a first voltage level and may provide a regulated output voltage at a second voltage level. An enclosure may house the voltage regulator and may include a first slot to receive a first rectifier module and a second slot to receive a second rectifier module. The first slot may be configured to couple a first output from the first rectifier module to the input of the first voltage regulator, and the second slot may be configured to couple a first output from the second rectifier module to the input of the first voltage regulator.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1B:
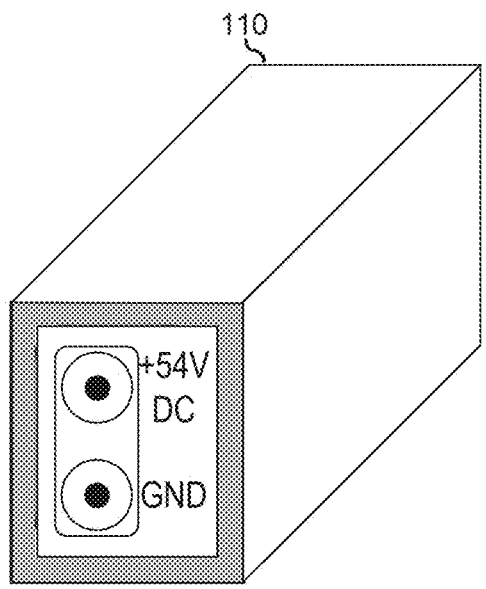
FIG. 1B is a perspective view of a DC rectifier module for the power supply unit of FIG. 1A.
Figure 1C:
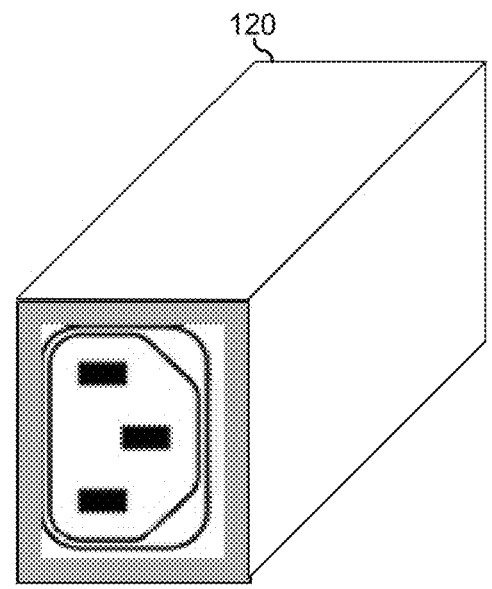
FIG. 1C is a perspective view of an AC rectifier module for the power supply unit of FIG. 1A.
Figure 1A:
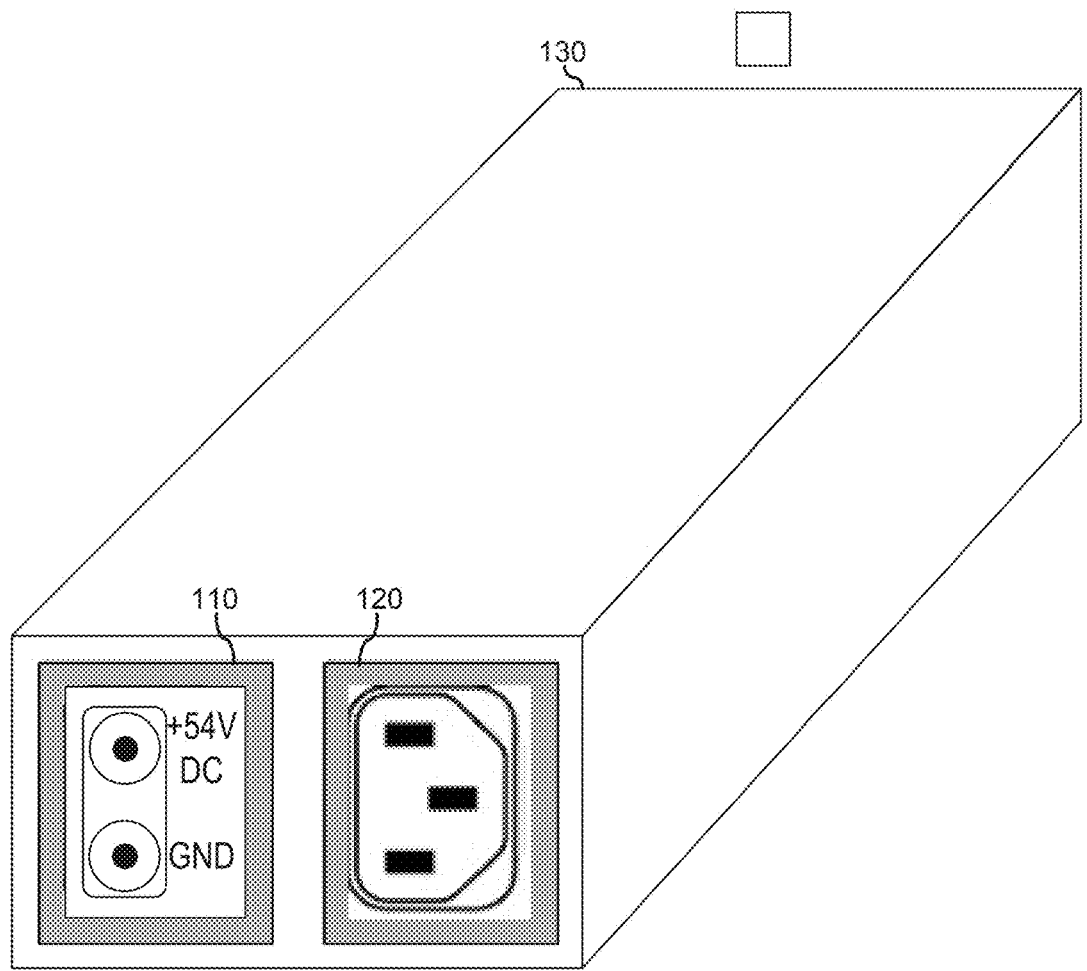
FIG. 1A is a perspective view of a power supply unit according to an embodiment of the current disclosure.

FIG. 1A illustrates a power supply unit (PSU) 100. PSU 100 represents a modular power supply configured to be removably installed into computer equipment in, for example, a server rack of a data center. PSU 100 is thus configured to receive power from, for example, an direct current (DC) bus bar arrangement or an alternating current (AC) power source, and to condition the received power to provide power rails for the computer equipment into which the PSU is installed at the various voltage levels necessary for the operation of the computer equipment. PSU 100 is configured to be inserted into a PSU slot at the back side of the computer equipment, and, when fully seated in the PSU slot, to engage with a connector that includes the power rails and other control signals, as needed or desired. PSU 100 is illustrated in a back view, and includes a DC rectifier module 110, an AC rectifier module, and a PSU enclosure 130.

DC rectifier module 110 and AC rectifier module 120 are removably installed into PSU enclosure 130. Thus FIG. 1B illustrates DC rectifier module 110, as removed from PSU enclosure 130, and FIG. 1C illustrates AC rectifier module 120, as removed from the PSU. DC rectifier module 110 is illustrated as including a two-pin power receptacle, but may be configured utilizing other types of receptacles as needed or desired. Similarly, AC rectifier module 120 is illustrated as including a standard computer equipment AC power cable receptacle (that is, a C-3 power receptacle), but may be configured utilizing other types of receptacles as needed or desired. While PSU 100 is illustrated as including one (1) DC rectifier module 110 and one (1) AC rectifier module 120, as will be shown and described below, either type of rectifier module can be installed into either PSU slot. Thus PSU 100 can also be configured with two (2) DC rectifier modules 110, or with two (2) AC rectifier modules 120, as needed or desired. As such, PSU 100 is configurable with a wide range of options for redundancy, including redundancy based on both AC and DC power sources, redundancy based on two separate AC power sources, or redundancy based on two separate DC busbars, as needed or desired. As described further below, DC rectifier module 110 and AC rectifier module 120 are both hot-swappable within PSU enclosure 130.

Figure 2:
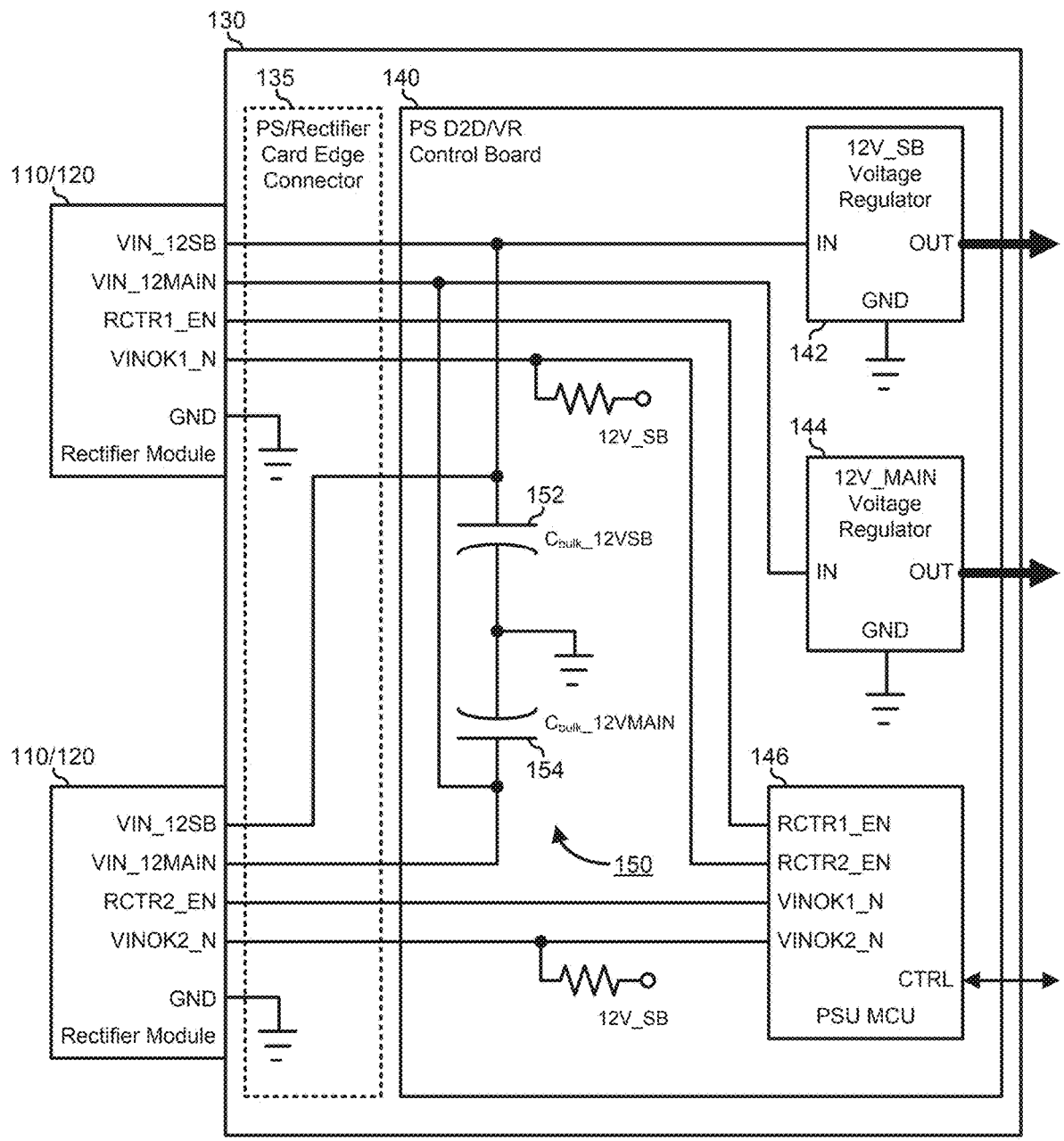
FIG. 2 is a block diagram of the power supply unit of FIG. 1A.

FIG. 2 illustrates PSU 100 in a block diagram form. Two rectifier modules are shown, without regard to the power input to the rectifier modules. In this view, the rectifier modules can be either DC rectifier modules 110 or AC rectifier modules 120, as needed or desired. As such, the rectifier modules are shown as rectifier modules 110/120. PSU enclosure 130 includes a PSU/rectifier card-edge connector 135 and a PSU DC-to-DC converter/voltage regulator and control board 140. Connector 135 connects rectifier modules 110/120 to control board 140. In particular each input to, and output from, rectifier modules 110/120 are connected via connector 135 when fully installed into PSU 100, as described below.

Control board 140 includes 12V DC voltage regulators 142 and 144, a PSU micro controller unit (MCU) 146, and a bulk capacitor bank 150. 12V DC voltage regulator 142 provides a 12V standby power rail to the computer equipment into which PSU 100 is installed. In this regard, 12V voltage regulator 142 provides the 12V standby power rail continuously, that is, as long as one or more of rectifier modules 110/120 are connected to the appropriate power source. As such, 12V voltage regulator 142 may be referred to as a standby voltage regulator. 12V DC voltage regulator 144 provides a switched 12V power rail to the computer equipment into which PSU 100 is installed. In this regard, 12V voltage regulator 142 provides the switched 12V power rail only PSU MCU 146 deems that a power state of the computer system requires that power be available on the power rail.

In particular, PSU MCU 146 operates to provide an individual enable signal to each one of rectifier modules 110/120 to enable a power output to provide power to 12V voltage regulator 144, and thus 12V voltage regulator 144 only provides the switched power rail when required by the PSU MCU. The switched 12V power rail provides the main power to the components of the computer equipment. As such, 12V voltage regulator 144 may be referred to as a main voltage regulator. Each of 12V voltage regulators 142 and 144 receives a DC voltage at an input (IN), and regulates the input voltage to the 12V level of the standby power rail and the main power rail, as described herein. In a particular embodiment, as described further below, the input voltage is at 54V. The details of voltage regulation are known in the art and will not be further described herein, except as may be needed to illustrate the current embodiments.

Thus, each of rectifier modules 110/120 provides an unswitched standby power output (VIN_12SB) to the input (IN) of standby voltage regulator 142, and a switched main power output (VIN_12MAIN) to the input of main voltage regulator 144. Each of rectifier modules 110/120 provides an output signal (VINOK) to PSU MCU 146. The VINOK signal is an active-low signal that indicates that the power received by the rectifier modules is stable and at a desired voltage level. Being an active-low signal, each of the VINOK signals are provided with a pullup resistor to the 12V standby power rail. When PSU MCU 146 desires to turn on main voltage regulator 144, the PSU MCU checks the VINOK signal for each rectifier module 110/120 to determine if the power received by the rectifier modules is stable and at a desired voltage level. If the VINOK signal is low, PSU MCU 146 asserts a rectifier enable signal (RECTR_EN) to the appropriate one of rectifier module 110/120 to direct the rectifier module to enable the main power output (VIN_12MAIN). The details of computer equipment power states and the enabling of switched voltage regulators are known in the art and will not be further described herein, except as may be needed to illustrate the current embodiments.

Bulk capacitor bank 150 is provided to smooth out any ripples that may exist on the standby output (VIN_12SB) and the switched main output (VIN_12MAIN) of rectifier modules 110/120. Bulk capacitor bank 150 includes bulk capacitors 152 and 154. Bulk capacitor 152 is connected between the standby power input (IN) of standby voltage regulator 142 and a ground plane of control board 140, and bulk capacitor 154 is connected between the main power input (IN) of main voltage regulator 144 and the ground plane. The details of providing bulk capacitance in a switching power supply are known in the art, and will not be further described herein, except as may be needed to illustrate the current embodiments.

Figure 3:
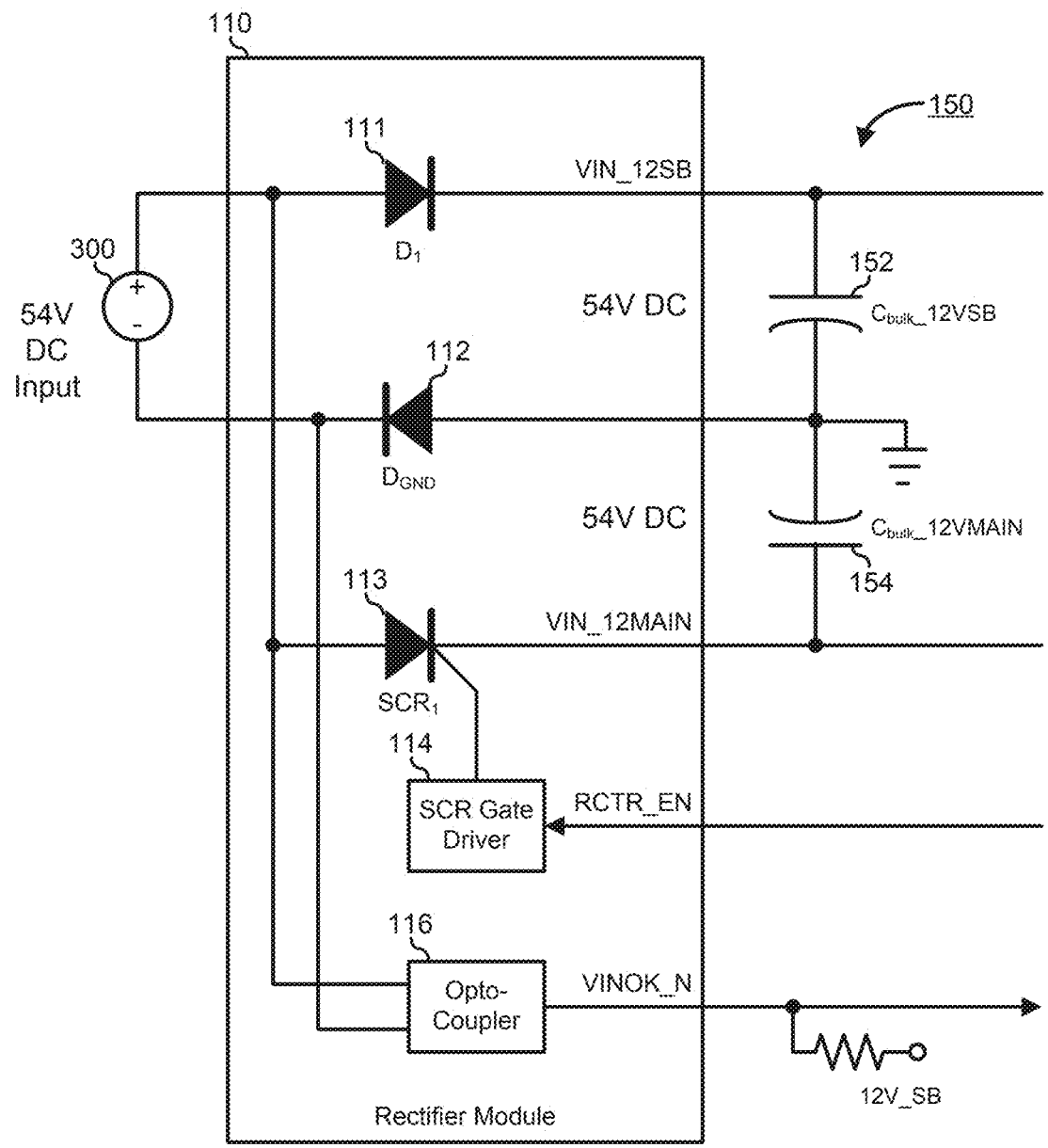
FIG. 3 is a block diagram of the rectifier module of FIG. 1B.

FIG. 3 illustrates DC rectifier module 110. DC rectifier module 110 includes diodes 111 and 112, a silicon control rectifier (SCR) 113, a SCR gate driver 114, and an optical coupler 116. FIG. 3 also includes a DC input source 300 that provides a 54V DC input to DC rectifier module 110, and also includes bulk capacitor stack 150 for clarity of illustration. An anode of diode 111 is connected to a positive terminal of DC input source 300, and a cathode of the diode provides the standby output (VIN_12SB), and is connected to a first terminal of bulk capacitor 152. An anode of diode 112 is connected to a second terminal of bulk capacitor 152, and to a ground plane, and a cathode of the diode is connected to a negative terminal of DC input source 300. An anode of SCR 113 is connected to the positive terminal of DC input source 300, a cathode of the SCR provides the main output (VIN_12MAIN), and is connected to a first terminal of bulk capacitor 154, and a control input of the SCR is connected to a control output of SCR gate driver 114. A control input to SCR gate driver 114 is connected to the enable input (RCTR_EN) from the PSU MCU (not illustrated). A first control input to optical coupler 116 is connected to the positive terminal of DC input source 300, a second control input to the optical coupler is connected to the negative terminal of the DC input source, and an output of the optical coupler provides the input power condition indication (VINOK_N) to the PSU MCU. A second terminal of bulk capacitor 154 is connected to the second terminal of bulk capacitor 152 and to the ground plane.

In operation, DC power source 300, diode 111, bulk capacitor 152, and diode 112 provide a forward biased circuit that maintains a 54V charge at all times on the bulk capacitor, and to the input (IN) of the standby voltage regulator (not illustrated). Similarly, DC power source 300, SCR 113, bulk capacitor 154, and diode 112 provide a forward biased circuit that maintains a 54V charge on the bulk capacitor, and to the input (IN) of the main voltage regulator (not illustrated) when the SCR is turned on. SCR 113 is turned on in response to the assertion by the PSU MCU of the rectifier enable input (RECTR_EN). As described above, the PSU MCU does not assert the rectifier enable input (RECTR_EN) until the input power condition indicator (VINOK_N) is pulled low to indicate that the power supplied by DC input source 300 is stable. The inputs of optical coupler 116 work to ensure that the input power condition remains within an acceptable range before asserting the input power condition indicator (VINOK_N).

Figure 4:
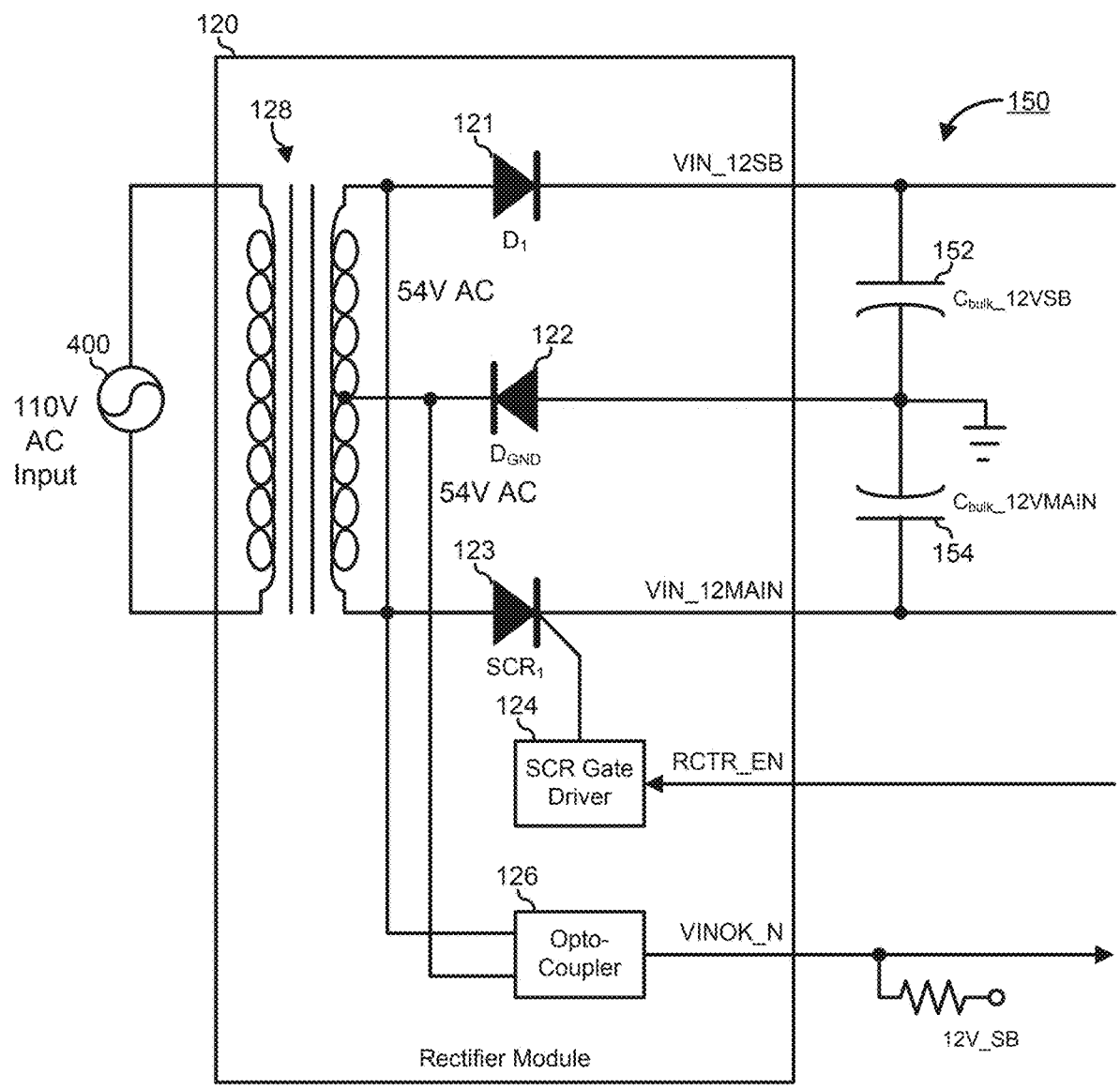
FIG. 4 is a block diagram of the rectifier module of FIG. 1C.

FIG. 4 illustrates AC rectifier module 120. AC rectifier module 120 includes diodes 121 and 122, a SCR 123, a SCR gate driver 124, an optical coupler 126, and a center-tap transformer 128. FIG. 4 also includes an AC input source 300 that provides a 110V AC input to AC rectifier module 120, and also includes bulk capacitor stack 150 for clarity of illustration. AC input source 400 is connected to a primary winding of transformer 128. An anode of diode 121 is connected to a top tap of a secondary winding of transformer 128, and a cathode of the diode provides the standby output (VIN_12SB), and is connected to a first terminal of bulk capacitor 152. An anode of diode 122 is connected to a second terminal of bulk capacitor 152, and to a ground plane, and a cathode of the diode is connected to a center tap of the secondary winding of transformer 128.

An anode of SCR 123 is connected to a bottom tap of the secondary winding of transformer 128, a cathode of the SCR provides the main output (VIN_12MAIN), and is connected to a first terminal of bulk capacitor 154, and a control input of the SCR is connected to a control output of SCR gate driver 124. A control input to SCR gate driver 124 is connected to the enable input (RCTR_EN) from the PSU MCU (not illustrated). A first control input to optical coupler 126 is connected to the positive terminal of AC input source 300, a second control input to the optical coupler is connected to the negative terminal of the AC input source, and an output of the optical coupler provides the input power condition indication (VINOK_N) to the PSU MCU. A second terminal of bulk capacitor 154 is connected to the second terminal of bulk capacitor 152 and to the ground plane. AC input source 400 is connected to a primary winding of transformer 128.

In operation, the top half of the secondary winding of transformer 128, diode 121, bulk capacitor 152, and diode 122 provide a rectified forward biased circuit that maintains a 54V charge at all times on the bulk capacitor, and to the input (IN) of the standby voltage regulator (not illustrated). Similarly, the bottom half of the secondary winding of transformer 128, SCR 123, bulk capacitor 154, and diode 122 provide a rectified forward biased circuit that maintains a 54V charge on the bulk capacitor, and to the input (IN) of the main voltage regulator (not illustrated) when the SCR is turned on. SCR 123 is turned on in response to the assertion by the PSU MCU of the rectifier enable input (RECTR_EN). However, as described above, the PSU MCU does not assert the rectifier enable input (RECTR_EN) until the input power condition indicator (VINOK_N) is pulled low to indicate that the power supplied by AC input source 300 is stable. The inputs of optical coupler 126 work to ensure that the input power condition remains within an acceptable range before asserting the input power condition indicator (VINOK_N).

From the perspective of PSU enclosure 130, and more particularly from the perspective of control board 140, the operation of PSU 100 is identical, regardless of the configuration of the rectifier modules that provide the inputs. Both DC rectifier module 110 and rectifier module 120 provide identical functionality to PSU 100, and the only difference from an operational perspective is the type of input power source (that is, DC input power versus AC input power). The provision of two separate rectifier modules 110 and 120 permits not only flexibility in the configuration, but a measure of redundancy in the input power source with a single PSU 100. This is in contrast to the typical computer hardware that requires two (2) complete PSUs in order to achieve input power redundancy. In a particular case, rectifier modules 110 and 120 require PSU MCU to assert their respective enable signal (RECTR_EN) in order to provide power on their main output (VIN_12MAIN). In this way, PSU 100 can be utilized in a fail-over mode of operation, where only one (1) of rectifier modules 110/120 has its main output (VIN_12MAIN) enabled. Then, when the input source for that rectifier module experiences a fail, PSU 100 can provide a fail-over option to enable the main output (VIN_12MAIN) on the other rectifier module 110/120. Even when both rectifier modules 110/120 are enabled, there is no issue with current balancing because the primary function of the rectifier modules is to maintain a DC voltage on bulk capacitors 152 and 154.

The configuration of DC rectifier module 110 and of AC rectifier module 120 renders the rectifier modules as hot-swappable within PSU 100 without additional modification. In particular, in a hot unplug event the enabled rectifier module (that is, the rectifier module that has its RCTR_EN signal enabled) is operating to maintain the standby power output (VIN_12SB) to charge bulk capacitor 152 and to maintain the main power output (VIN_12MAIN) to charge bulk capacitor 154. Assume here that a DC rectifier module 110 is being hot unplugged. In this state, diodes 111 and 112 are "ON" to the extent needed to maintain the voltage on bulk capacitor 152, and diode 112 and SCR 113 are "ON" to the extent needed to maintain the voltage on bulk capacitor 154. The voltage level on bulk capacitors 152 and 154 determine the current value in diode 111 and in SCR 113, as determined by their particular component I-V characteristics. As such, a lower voltage on bulk capacitor 152 results in a higher voltage drop across diodes 111 and 112, resulting in a higher forward charging current on the bulk capacitor. Likewise, a lower voltage on bulk capacitor 154 results in a higher voltage drop across diode 112 and SCR 113, resulting in a higher forward charging current on the bulk capacitor. In this case, it only remains to PSU MCU to detect the loss of the associated power condition signal (VINOK_N) for the removed rectifier module 110/120, and to respond by ensuring that the enable signal (RCTRE_EN) for the other rectifier module is asserted if the hot unplugged rectifier module was enabled.

In a hot insertion event, the already installed rectifier module 110/120 will be understood to be maintaining the voltage on bulk capacitor 152, and if enabled (the RCTR_EN signal is asserted), to be maintaining the voltage on bulk capacitor 154. Thus the insertion of the second rectifier module 110/120 will not cause any undue inrush current as it diodes turn on, because diode 111 and SCR 113 will limit the inrush current based on their component I-V characteristics. Moreover, the main power output (VIN_12MAIN) will not be turned on by the assertion of the enable signal (RCTR_EN) until the hot plugged rectifier module 110/120 asserts its power condition indicator (VINOK_N).

Figure 5:
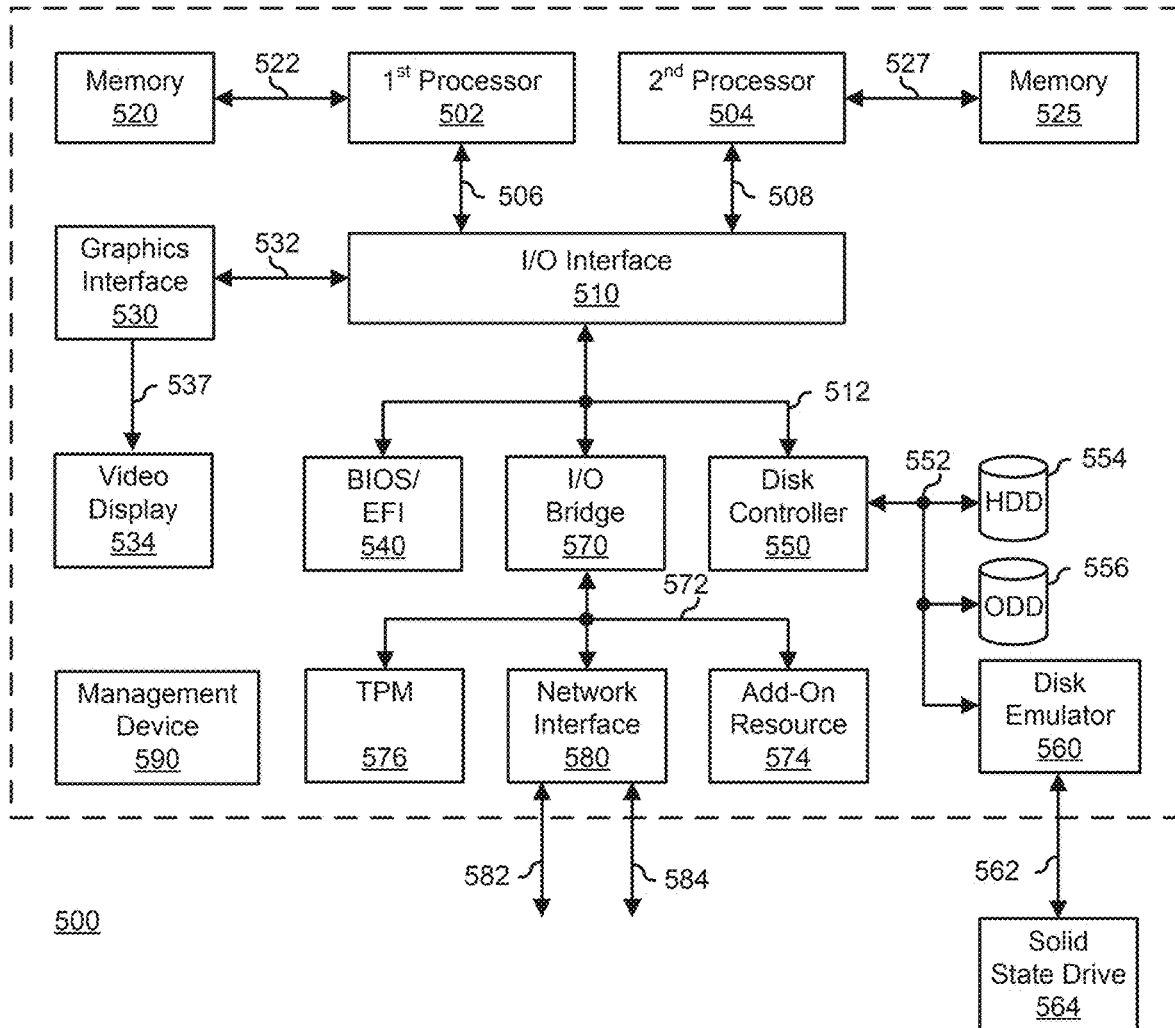
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 564, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 564, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 5394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A power supply unit for a computer component, the power supply unit comprising:
   a first voltage regulator configured to receive a first input voltage at a first voltage level and to provide a first regulated output voltage at a second voltage level; and
   an enclosure to house the voltage regulator, wherein the enclosure includes a first slot to receive a first rectifier module and a second slot to receive a second rectifier module, and wherein the first slot is configured to couple a first output from the first rectifier module to the input of the first voltage regulator, and the second slot is configured to couple a first output from the second rectifier module to the input of the first voltage regulator.

2. The power supply unit of claim 1, further comprising a second voltage regulator configured to receive a second input voltage at a third voltage level and to provide a second regulated output voltage at a fourth voltage level.

3. The power supply unit of claim 2, wherein the first slot is further configured to selectably couple a second output from the first rectifier module to the input of the second voltage regulator, and the second slot is further configured to selectably couple a second output from the second rectifier module to the input of the second voltage regulator.

4. The power supply unit of claim 3, wherein the power supply unit is configured to provide a first enable signal to the first slot, the first enable signal directing the first rectifier module to provide the third voltage level on the second output of the first rectifier module, and to provide a second enable signal to the second slot, the second enable signal directing the second rectifier module to provide the third voltage level on the second output of the second rectifier module.

5. The power supply unit of claim 1, further comprising:
   a first bulk capacitor coupled between the input of the first voltage regulator and a ground plane; and
   a second bulk capacitor coupled between the input of the second voltage regulator and the ground plane.

6. The power supply unit of claim 1, wherein the power supply unit includes the first rectifier module and the second rectifier module.

7. The power supply unit of claim 6, wherein the first rectifier module is a first direct current (DC) rectifier module configured to receive a DC voltage on an input of the first rectifier module and to provide the DC voltage on the first and second outputs of the first rectifier module.

8. The power supply unit of claim 7, wherein the second rectifier module is a second DC rectifier module configured to receive the DC voltage on an input of the second rectifier module and to provide the DC voltage on the first and second outputs of the second rectifier module.

9. The power supply unit of claim 7, wherein the second rectifier module is an alternating current (AC) rectifier module configured to receive an AC voltage on an input of the second rectifier module and to provide the DC voltage on the first and second outputs of the second rectifier module.

10. The power supply unit of claim 6, wherein the first rectifier module and the second rectifier modules are alternating current (AC) rectifier modules, each AC rectifier module configured to receive an AC voltage on an input of the AC rectifier module and to provide a DC voltage on the first and second outputs of the AC rectifier module.

11. A method, comprising:
   providing, in a power supply unit for a computer component, a first voltage regulator configured to receive a first input voltage at a first voltage level and to provide a first regulated output voltage at a second voltage level;
   providing, in the power supply unit, an enclosure to house the voltage regulator, wherein the enclosure includes a first slot to receive a first rectifier module and a second slot to receive a second rectifier module;
   coupling a first output from the first rectifier module to the input of the first voltage regulator; and
   coupling a first output from the second rectifier module to the input of the first voltage regulator.

12. The method of claim 11, further comprising providing a second voltage regulator configured to receive a second input voltage at a third voltage level and to provide a second regulated output voltage at a fourth voltage level.

13. The method of claim 12, further comprising:
   selectably coupling a second output from the first rectifier module to the input of the second voltage regulator; and selectably coupling a second output from the second rectifier module to the input of the second voltage regulator.

14. The method of claim 13, further comprising:
providing, by the power supply unit, a first enable signal to the first slot, the first enable signal directing the first rectifier module to provide the third voltage level on the second output of the first rectifier module; and
providing, by the power supply unit, a second enable signal to the second slot, the second enable signal directing the second rectifier module to provide the third voltage level on the second output of the second rectifier module.

15. The method of claim 11, further comprising:
providing, in the power supply unit, a first bulk capacitor coupled between the input of the first voltage regulator and a ground plane; and
providing, in the power supply unit, a second bulk capacitor coupled between the input of the second voltage regulator and the ground plane.

16. The method of claim 11, wherein the first rectifier module is a first direct current (DC) rectifier module configured to receive a DC voltage on an input of the first rectifier module and to provide the DC voltage on the first and second outputs of the first rectifier module.

17. The method of claim 16, wherein the second rectifier module is a second DC rectifier module configured to receive the DC voltage on an input of the second rectifier module and to provide the DC voltage on the first and second outputs of the second rectifier module.

18. The method of claim 16, wherein the second rectifier module is an alternating current (AC) rectifier module configured to receive an AC voltage on an input of the second rectifier module and to provide the DC voltage on the first and second outputs of the second rectifier module.

19. The method of claim 11, wherein the first rectifier module and the second rectifier modules are alternating current (AC) rectifier modules, each AC rectifier module configured to receive an AC voltage on an input of the AC rectifier module and to provide a DC voltage on the first and second outputs of the AC rectifier module.

20. A power supply unit for a computer component, the power supply unit comprising:
a first voltage regulator configured to receive a first input voltage at a first voltage level and to provide a first regulated output voltage at a second voltage level;
a second voltage regulator configured to receive a second input voltage at a third voltage level and to provide a second regulated output voltage at a fourth voltage level;
a first rectifier module configured to couple a first output from the first rectifier module to the input of the first voltage regulator, and to selectably couple a second output from the first rectifier module to the input of the second voltage regulator;
a second rectifier module configured to couple a first output from the second rectifier module to the input of the first voltage regulator, and to selectably couple a second output from the second rectifier module to the input of the second voltage regulator;
an enclosure to house the voltage regulator, wherein the enclosure includes a first slot to receive the first rectifier module and a second slot to receive the second rectifier module; and
a control unit to select the first rectifier module to couple the second output from the first rectifier module to the input of the second voltage regulator, and to select the second rectifier module to couple the second output from the second rectifier module to the input of the second voltage regulator.

\* \* \* \* \*